Ingram & Stuart,
Water Closet,
Nº 4,926. Patented Jan. 13, 1847.
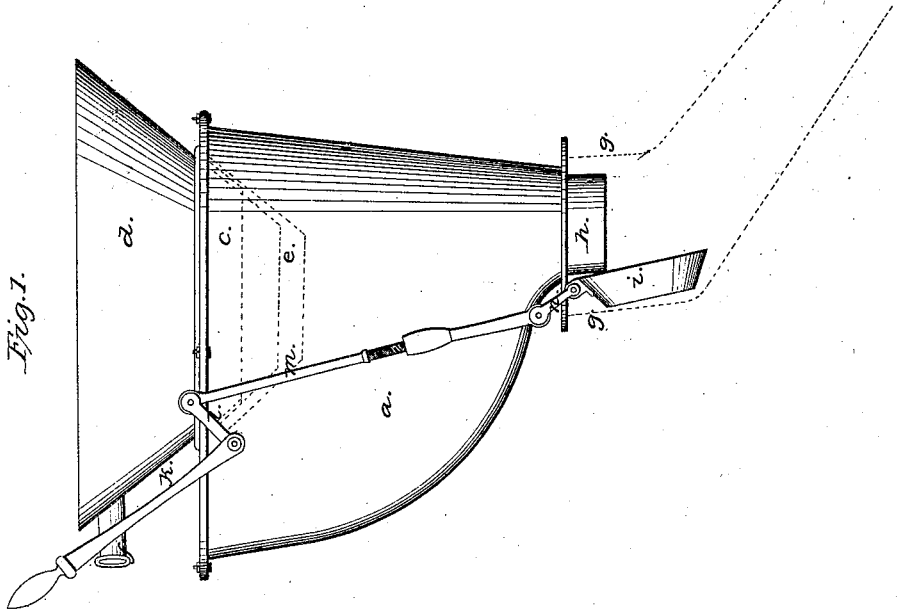
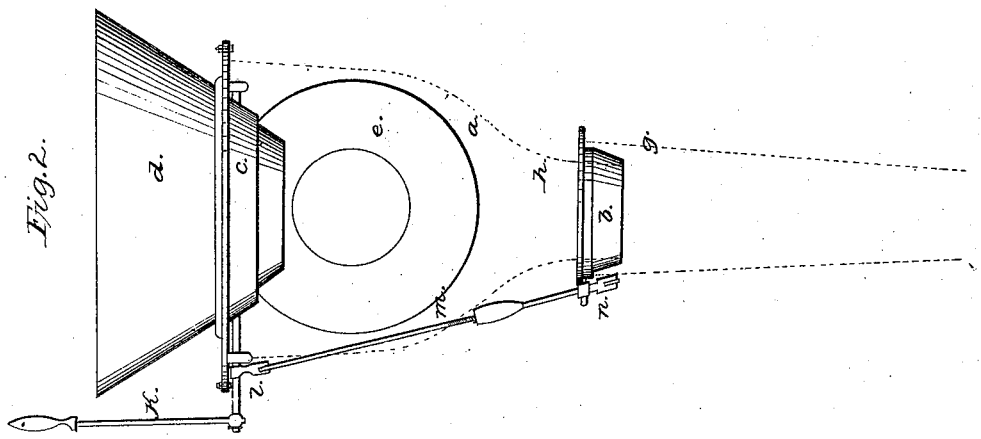

UNITED STATES PATENT OFFICE.

J. INGRAM AND J. STEUART, OF NEW YORK, N. Y.

WATER-CLOSET.

Specification of Letters Patent No. 4,926, dated January 13, 1847.

*To all whom it may concern:*

Be it known that we, JAMES INGRAM and JAMES STEUART, of the city, county, and State of New York, have invented new and useful Improvements in Water-Closets, and that the following is a full, clear, and exact description of the principle or character which distinguishes them from all other things before known and of the manner of making, constructing, and using the same, reference being had to the accompanying drawings, making part of this specification, in which—

Figure 1 is a side elevation of the apparatus removed from the casing, and Fig. 2 a front elevation thereof.

The same letters indicate like parts in all the figures.

In the water-closets heretofore and now employed the basin is let into the trunk or body with the lower part extending down and dipping in water in a copper pan jointed to the underside of the cover of the trunk when closed up and filled with water, for the purpose of preventing the escape of effluvia into the apartment, the upper part of the conducting tube into which fits the lower end or nozzle of the trunk being curved and forming a dish to contain a sufficient quantity of the liquid of the previous discharge for the nozzle of the trunk to dip into to prevent the escape of too much effluvia when the pan under the basin is let down. The objections to this arrangement are: first, the basin has to be repaired frequently, so that when it is removed there is nothing to prevent the escape of the effluvia arising from the deposit left in the upper or curved part of the discharge pipe, which renders the changing or repairing of the basin a matter of much inconvenience. And the next objection arises from the retention of the liquid, &c., of the previous discharge of the basin in the curved or dished part of the discharge pipe, which not only gives out much stench when the pan of the basin is opened, but tends to corrode the metal of which it is made, which in consequence requires to be frequently renewed, and is always subject to be choked by rags, dirt, &c. All these inconveniences are avoided by our improvements, which consist: first in surrounding the hole made in the top of the trunk for the reception of the basin with a flanch cast with the top of the trunk, the said flanch extending down sufficiently to dip with the lower edge of the basin in the water contained in the pan of the basin, so that the basin can be removed at any time without permitting the escape of effluvia into the apartment, this arrangement at the same time avoiding the expensive necessity of uniting the basin and top of the trunk by an air-tight joint which requires frequent repairs to keep out foul air. And secondly, in providing the discharge nozzle of the trunk with a second hinged pan connected with the upper pan by means of a link so arranged that when the upper pan is opened this latter is closed and catches the water discharged by the first, so that the nozzle of the trunk by this means dips in water to prevent the escape of foul air as the upper part or basin is opened, the water from the first answering for the second.

In the accompanying drawings (*a*) represents the trunk or body made in the usual manner except that the top is cast with a dip flanch (*c*) surrounding the hole for the reception of the basin (*d*) which is made of earthen ware and simply set into this dip flanch. The first pan (*e*) is made in the usual manner and jointed to the underside of the cover of the trunk, and so located that when the pan is thrown up and filled with water from a water pipe (*f*) the lower edge of the basin and the dip flanch surrounding it dip into the water and thus effectually prevent the escape of any bad odor from below, and therefore avoids the necessity of uniting the basin with the top of the trunk by an air-tight joint. The upper part of the discharge pipe (*g*) which receives the discharge nozzle (*h*) of the trunk instead of being curved in the form of a dish, is bent down in any manner desired, as represented by dotted lines in Fig. 1, and within this and by the side of the lower end of the nozzle of the trunk is jointed a second pan (*i*) so located that when it is thrown up and filled with water the nozzle dips into the water and thus prevents the escape of any bad odor from below. The axle to which the upper pan is attached is provided with a handle (*k*) by which the pan is opened and closed, and it is also provided with an arm (*l*) connected by means of a jointed rod (*m*) with a like arm (*n*) on the axle of the second pan, so that when the upper pan is closed the lower one is opened, and vice versa, by means of which arrangement the water discharged from the upper pan as it is opened is caught by the second pan as it is being closed, thus cutting off all connection with the discharge pipe.

The two pans can be connected by any known mechanical device which will close the one as the other is opened, such as a counterweight and catch, as is well known to mechanicians.

What we claim as our invention, and desire to secure by Letters Patent, is—

1. Surrounding the basin with a dip flanch, when this is combined with the pan for containing water, substantially as described, whereby the escape of noxious odors is prevented when the basin is removed, and the necessity of uniting the basin with the top of the trunk avoided, as described.

2. And we also claim the second jointed pan for preventing the escape of odors when the first pan is opened, when this is combined with the first pan, substantially as described.

JAMES INGRAM.
JAMES STEUART.

Witnesses:
 JOSEPH MOORE,
 THOMAS STUART.